(12) United States Patent
Shiu et al.

(10) Patent No.: US 8,326,257 B2
(45) Date of Patent: Dec. 4, 2012

(54) UTILIZING SPEED AND POSITION INFORMATION TO SELECT AN OPERATIONAL MODE IN A WIRELESS COMMUNICATION SYSTEM

(75) Inventors: Da-Shan Shiu, San Jose, CA (US); Daisuke Terasawa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/357,793

(22) Filed: Feb. 3, 2003

(65) Prior Publication Data

US 2004/0082311 A1    Apr. 29, 2004

Related U.S. Application Data

(60) Provisional application No. 60/422,044, filed on Oct. 28, 2002.

(51) Int. Cl.
*H04M 11/00* (2006.01)
(52) U.S. Cl. ............ 455/403; 455/404.2; 455/440; 455/441; 455/456.1
(58) Field of Classification Search .......... 455/403, 455/404.2, 414.2, 440, 456.1, 457, 101, 238.1, 455/441
See application file for complete search history.

(56) References Cited

U.S. PATENT DOCUMENTS

| | | | |
|---|---|---|---|
| 5,390,339 A * | 2/1995 | Bruckert et al. | 455/440 |
| 5,548,836 A * | 8/1996 | Taromaru | 455/277.1 |
| 5,629,710 A * | 5/1997 | Sawada | 342/457 |
| 5,696,798 A * | 12/1997 | Wright et al. | 375/345 |
| 5,960,350 A | 9/1999 | Schorman et al. | |
| 6,029,057 A * | 2/2000 | Paatelma et al. | 455/277.2 |
| 6,041,235 A * | 3/2000 | Aalto | 455/437 |
| 6,195,559 B1 * | 2/2001 | Rapeli et al. | 455/500 |
| 6,229,481 B1 | 5/2001 | Katz | |
| 6,411,824 B1 * | 6/2002 | Eidson | 455/561 |
| 6,421,538 B1 * | 7/2002 | Byrne | 455/441 |
| 6,466,797 B1 * | 10/2002 | Frodigh et al. | 455/456.1 |
| 6,539,209 B1 * | 3/2003 | Dajer et al. | 455/101 |
| 6,628,638 B1 * | 9/2003 | Sato et al. | 370/343 |
| 6,671,499 B1 * | 12/2003 | Ylitalo et al. | 455/101 |
| 6,741,658 B1 * | 5/2004 | Ionescu | 375/267 |
| 6,754,475 B1 * | 6/2004 | Harrison et al. | 455/115.1 |
| 6,831,943 B1 * | 12/2004 | Dabak et al. | 375/147 |
| 6,834,043 B1 * | 12/2004 | Vook et al. | 370/310 |
| 6,928,292 B2 * | 8/2005 | Tsunehara et al. | 455/456.1 |

(Continued)

FOREIGN PATENT DOCUMENTS

EP    1180856    8/2001

(Continued)

OTHER PUBLICATIONS

International Search Report-PCT/US03/034521, International Search Authority—European Patent Office—Apr. 6, 2004.

(Continued)

*Primary Examiner* — Nghi H Ly
(74) *Attorney, Agent, or Firm* — Liberty E. Mann

(57) ABSTRACT

A method and apparatus for determining an operational mode for use in a wireless communication system based on a location, a velocity, or both, of a wireless communication device (WCD) in relation to a wireless network infrastructure is described. The selected mode can be used by various devices within the communication system. Modes that are selected include transmit diversity and site selection diversity.

32 Claims, 6 Drawing Sheets

U.S. PATENT DOCUMENTS

| | | | |
|---|---|---|---|
| 6,954,735 B1* | 10/2005 | Djupsjobacka et al. | 705/27 |
| 6,970,560 B1* | 11/2005 | Hench et al. | 379/417 |
| 7,093,286 B1* | 8/2006 | King | 726/12 |
| 7,274,332 B1* | 9/2007 | Dupray | 342/450 |
| 7,277,407 B2* | 10/2007 | Kim et al. | 370/328 |
| 2002/0034936 A1* | 3/2002 | Itoh | 455/403 |
| 2002/0172223 A1* | 11/2002 | Stilp | 370/480 |
| 2003/0016737 A1* | 1/2003 | Wu et al. | 375/224 |
| 2006/0084381 A1* | 4/2006 | Hartwig | 455/41.2 |

FOREIGN PATENT DOCUMENTS

| | | |
|---|---|---|
| EP | 1180853 A1 | 2/2002 |
| EP | 1204219 | 8/2002 |
| WO | 99059255 | 11/1999 |
| WO | 0030384 | 5/2000 |
| WO | 0169814 | 9/2001 |
| WO | 0247286 | 6/2002 |

OTHER PUBLICATIONS

3GPP2 C.S0001-C Version 1.0 3rd Generation Partnership Project 2 "GGPP2" Introduction to CDMA2000 Standard for Spread Spectrum Systems Release C (May 28, 2002).

TIA/EIA-95-B Mobile Station-Base Station Compatibility Standard for Wideband Spread Spectrum Cellular Systems (Mar. 1999).

TIA/EIA-98-C C.S50011-0 3rd Generation Partnership Project 2 "GGPP2" Recommended Minimum Performance Standards for Dual-Mode Spread Spectrum Mobile Station (Nov. 1999).

International Preliminary Examination Report—PCT/US03/034521, International Preliminary Examination Authority, Alexandria, Virginia, US, Feb. 28, 2005.

* cited by examiner

UTILIZING SPEED AND POSITION INFORMATION TO SELECT AN OPERATIONAL MODE IN A WIRELESS COMMUNICATION SYSTEM

RELATED APPLICATIONS

This application claims priority to U.S. Provisional Application No. 60/422,044, filed on Oct. 28, 2002.

BACKGROUND OF THE INVENTION

1. Field of the Invention

The invention relates generally to control of communication devices in a wireless communication system, and more particularly, to selecting an operational mode of in a communication system.

2. Description of the Related Art

Communication over a wireless channel, in a wireless communication system, can be accomplished using a variety of techniques that facilitate a large number of users in a limited frequency spectrum. These techniques, commonly referred to as multiple access techniques, include time division multiple access (TDMA), frequency division multiple access (FDMA), and code division multiple access (CDMA).

In a wireless communication system, a signal may travel several distinct propagation paths as it propagates between base stations and wireless communication devices (WCD). A multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of mobile wireless communication devices and structures relative to a wireless network infrastructure and thereby create the multipath. Thus, if an ideal impulse is transmitted between wireless communication devices (WCD) and the wireless network infrastructure over the time varying multipath channel, the received stream of pulses changes in time delay, attenuation, and phase as a function of the time that the ideal impulse is transmitted.

The multipath characteristics of a channel can affect the signal received and result in, among other things, interference between the multipath signal instances. Destructive interference, commonly referred to as fading, is the result of the phasing characteristics of the multipath channel. A fade occurs when multipath vectors add destructively, yielding a received signal that is smaller in amplitude than either individual vector. For example, if a sine wave signal is transmitted through a multipath channel having two paths where the first path has an attenuation factor of X dB, a time delay of δ with a phase shift of Θ radians, and the second path also has an attenuation factor of X dB and a time delay of δ, but with a phase shift of Θ+π radians, no signal will be received at the output of the channel because the two signals, being of equal amplitude and opposite phase, will cancel each other. Thus, fading, such as the extreme conditions in the example, can have a severe negative effect on the performance of a wireless communication system. Conversely, multipath signal instances can interfere constructively if the multipath signals arrive in-phase with each other, resulting in an increase in the received signal strength rather than fading in the received signal strength.

WCDs and transceiver nodes in a wireless network infrastructure often have different modes of operation used to improve the transmission of signals between WCDs and the infrastructure in the presence of signal interference, such as fading. Two such modes are transmit diversity and site diversity. Transmit diversity refers to selecting, or modifying, the way in which signals are transmitted between an infrastructure device, such as a base station, and a WCD. Site diversity refers to selecting a desired base station, from a plurality of base stations, with which a WCD will communicate. Diversity modes can be open-loop or closed-loop. In general, open-loop diversity seeks to avoid statically destructive interference, and closed-loop diversity seeks to obtain constructive interference of signals received at the WCD.

The selection of an optimal operating mode is affected by the signal environment of the wireless channel. For example, if the conditions of the signal transmission path of the wireless channel are stable, and relatively unchanging, then it may be desirable to select a particular diversity mode, such as a closed-loop diversity mode. The closed-loop diversity modes can be selected if the closed-loop can track changes in the wireless channel, and is desirable because closed-loop diversity offers the advantage of constructive interference at a receiver. If the conditions of the signal transmission path of the wireless channel are rapidly changing, such that a closed-loop system cannot track the signal path changes in the channel, then it may be desirable to select a different diversity mode, such as an open-loop diversity mode.

There is therefore a need in the art for techniques to improve the selection of modes of operation of diversity for communication between WCDs and the wireless network infrastructure in a wireless communication system.

SUMMARY

A method and apparatus for selecting an operational mode for use in a wireless communication system based on a location, a velocity, or both, of a wireless communication device (WCD) in relation to a wireless network infrastructure is described. Aspects of the invention include determining the location, the velocity, or both, of the WCD. An estimate of the predictability of the wireless environment is made based on the location, or velocity, or both. Based on the estimated predictability of the wireless environment a desired diversity mode of operation is selected. The operational mode selected can be used by various devices within the communication system. For example, the diversity operational mode of a WCD can be selected, or the diversity operational mode of various nodes of the wireless network infrastructure (referred to as simply "infrastructure") can be selected.

Determining the location or the velocity of the WCD, and selecting the desired diversity operational mode, can be performed at various locations within the infrastructure, in the WCD, or in any combination thereof. For example, in one embodiment, the WCD determines its location, velocity, or both, estimates the predictability of the wireless environment, and based on the estimate selects a desired a desired diversity operational mode. In a second embodiment, the infrastructure determines the location, the velocity, or both, of the WCD, estimates the predictability of the wireless environment, and based on the estimate selects a desired a desired diversity operational mode. In a third embodiment, the WCD determines its location, velocity, or both, and transmits the information to the infrastructure. The infrastructure then estimates the predictability of the wireless environment, and based on the estimate selects a desired a desired diversity operational mode. In a fourth embodiment, the infrastructure determines the location, velocity, or both, of the WCD and transmits the information to the WCD. The WCD then estimates the predictability of the wireless environment, and based on the estimate selects a desired a desired diversity operational mode.

Selection of a desired diversity operational mode can include selection of a desired transmit diversity mode, or selection of a desired site selection diversity mode, or both. Selection of a desired transmit diversity can include selection of no diversity, open-loop transmit diversity such as space time transmit diversity (STTD) and use of fixed and steerable directional antennas, or closed loop transmit diversity. Selection of a desired site selection transmit diversity can include enabling or disabling site selection diversity, and selecting closed-loop site selection diversity such as a hard hand-off, soft hand-off, and site selection diversity transmission (SSDT).

Other features and advantages of the present invention should be apparent from the following description of the preferred embodiment which illustrates, by way of example, principles of the invention.

DETAILED DESCRIPTION

Techniques are described that improve the selection of different operational modes, including transmit diversity and site selection diversity, for communication between a WCD and a wireless network infrastructure, for example between a mobile WCD and a base station. Typically, both WCDs and wireless network infrastructure can be configured for various modes of operation.

In accordance with the invention, a mode of operation is selected in response to a prediction or an estimate of the wireless environment, which can be based on the location, velocity, or both, of a mobile WCD in relation to the infrastructure. The prediction or estimate relates to the signal path conditions between the WCD and the infrastructure. The selected mode of operation can involve, for example, selecting between different types of transmit diversity, or selecting between different types of site selection diversity, or both. The desired mode of operation can change as the WCD moves about, changing its location in relation to the infrastructure and as the WCD velocity changes, and thereby changing the conditions under which signals propagate between the mobile WCD and the infrastructure.

Determining the location, or velocity, of the WCD relative to the infrastructure can be performed in many different ways. For example, an indication of the WCD location or velocity can be received from a navigational receiver, such as a Global Positioning System (GPS) receiver, or other types of navigational receiver. In addition, the WCD velocity can be determined from at least two measurements of the location of the WCD that are made at different, known, moments in time. The velocity can be determined from the WCD location measurements and their respective measurement times. Location measurements can be complete location solutions or can be measurements that are used to compute a location solution. For example, the WCD may make pseudorange measurements from GPS satellites, and transfer the pseudorange measurements and the corresponding measurement times, to the wireless network infrastructure where the "pseudorange" measurements and additional GPS information gathered from a GPS receiver at the infrastructure are combined to determine the location and velocity of the WCD.

In another example, the infrastructure can make measurements on signals received from the WCD and determine location measurements of the WCD at different times. The infrastructure can determine the velocity of the WCD or the infrastructure can transmit the location measurement, and respective measurement times, to the WCD, which determines the WCD velocity.

In the description below, various aspects of the invention are described in terms of a wireless communication system based on CDMA. However, aspects of the invention are not limited to communication systems based on CDMA and may also be used in conjunction with other communication technologies.

Figure 1:
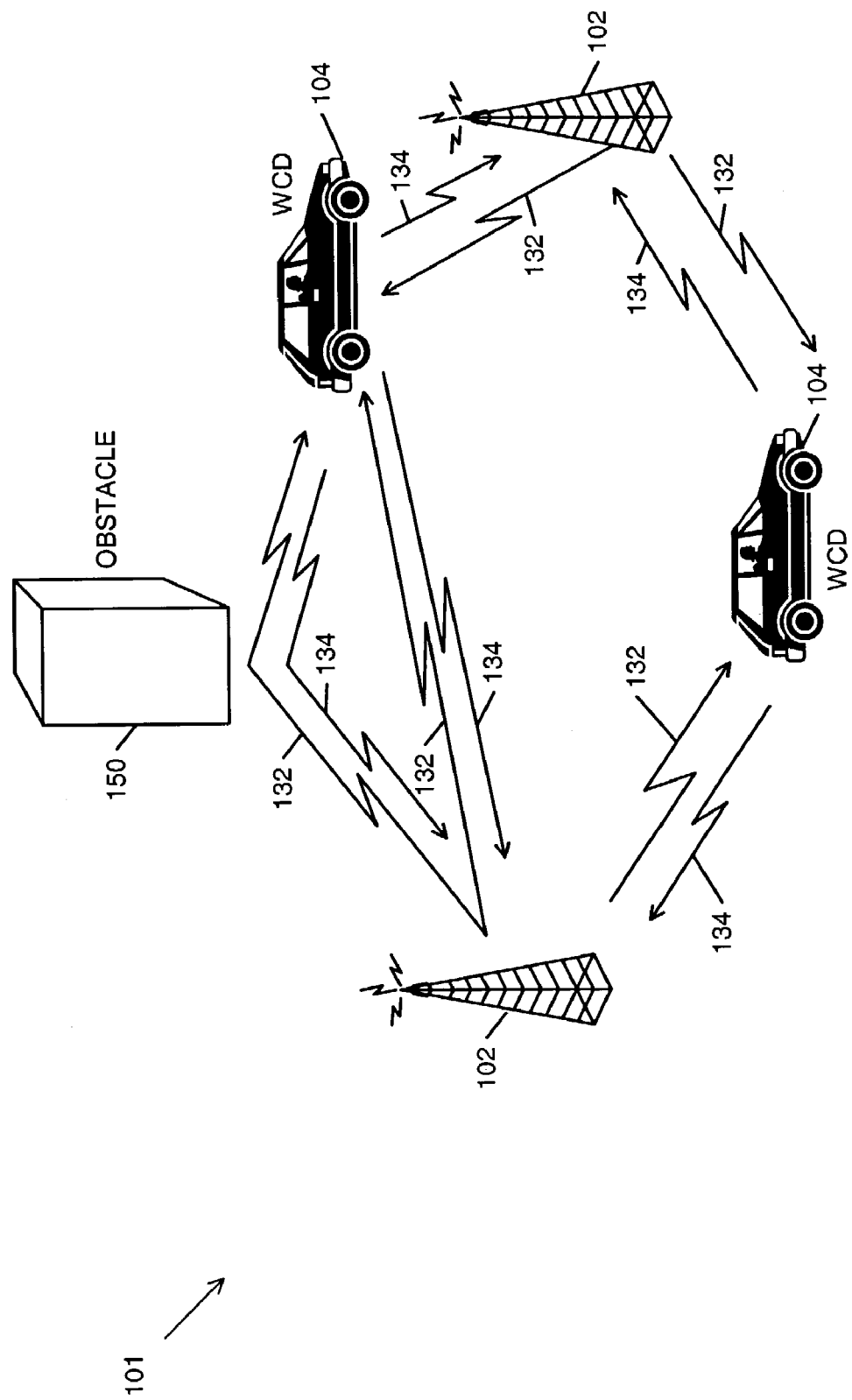
FIG. 1 is a block diagram illustrating portions of a wireless communication system that operates in accordance with the present invention.

FIG. 1 is a block diagram illustrating portions of a wireless communication system 101 that operates in accordance with the present invention. The wireless communication system includes a wireless network infrastructure with multiple base stations 102, and multiple, mobile WCDs 104. Signals 132 transmitted from a base station 102 to a WCD 104 are referred to as being transmitted in the direction of the forward link. Signals 134 transmitted from a WCD 104 to a base station 102 are referred to as being transmitted in the direction of the reverse link. As illustrated in FIG. 1, signals that travel in the forward link and the reverse link can travel different, multiple paths between a base station 102 and a WCD. As shown in FIG. 1, forward and reverse link signals may be reflected off an obstacle 150, resulting in multiple instances of the signal being received at the base station 102 and at the WCD 104. These multiple signal instances are commonly referred to as "multipath" signals. In addition to reflecting signals, an obstacle can block a signal from reaching a WCD completely.

Examples of WCDs 104 include cellular telephones, satellite telephones, wireless communication enabled personal computers, personal digital assistants (PDA), and other wireless devices. Examples of obstacles 150 include buildings, trees, cars, and people.

The wireless communication system 101 may be designed to support one or more wireless standards. For example, the standards may include TIA/EIA-95-B (IS-95), TIA/EIA-98-C (IS-98), 3$^{rd}$ Generation Partnership Project (3GPP); 3$^{rd}$ Generation Partnership Project 2 (3GPP2), TIA/EIA/IS-2000 (cdma2000), Wideband CDMA (WCDMA), and others.

Figure 2:
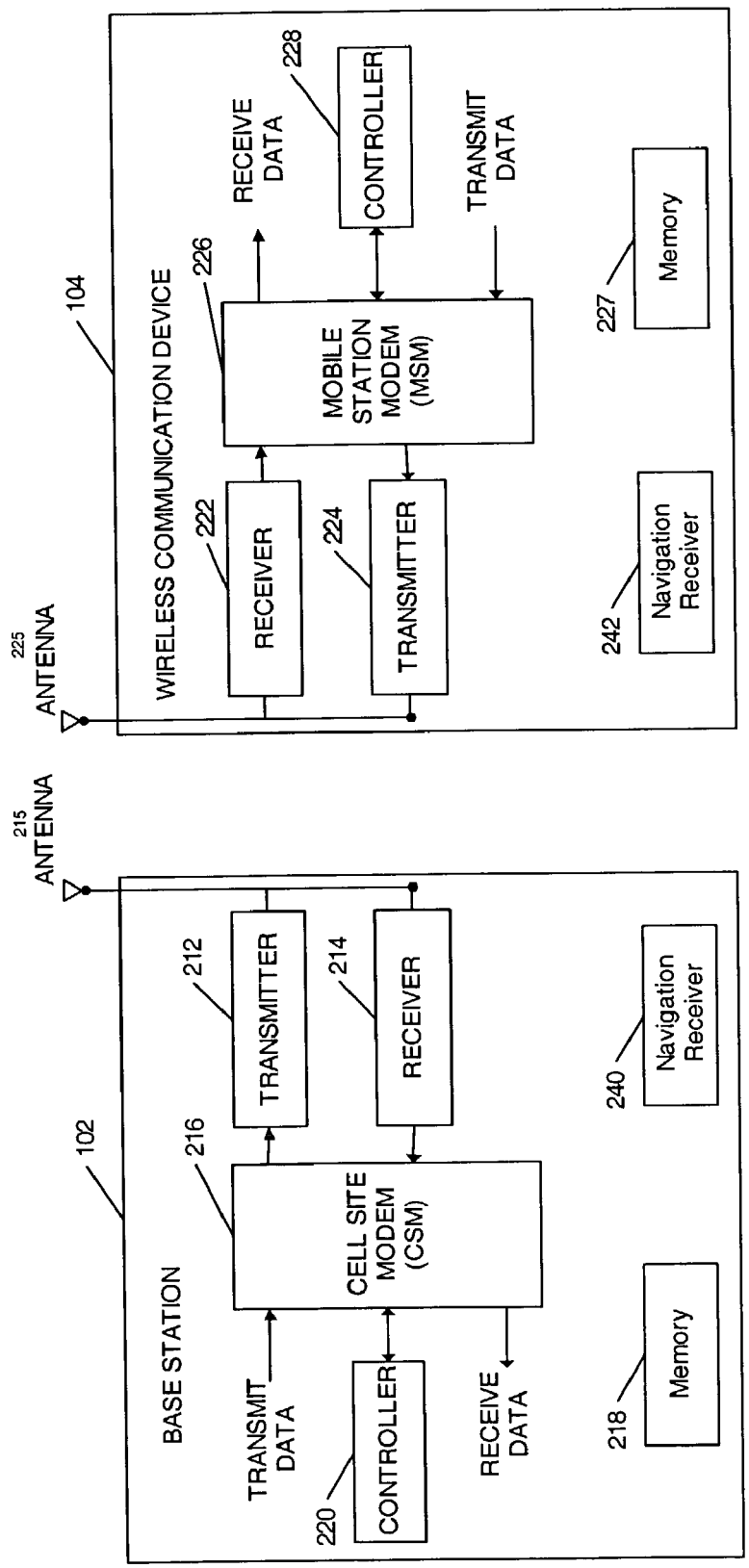
FIG. 2 is a block diagram illustrating additional detail of portions of the wireless communication system shown in FIG. 1.

FIG. 2 is a block diagram illustrating additional detail of portions of the wireless communication system 101 shown in FIG. 1. FIG. 2 further illustrates a base station 102 and a WCD 104 from FIG. 1. Included in the base station 102 is a transmitter 212, a receiver 214, an antenna 215, a cell site modem (CSM) 216, a memory block 218, and a controller 220. The WCD 104 includes a receiver 222, a transmitter 224, an antenna 225, a mobile station modem (MSM) 226, a memory block 227, and a controller 228. The memory blocks 218 and 227 and store, among other things, program instructions. Execution of the program instructions stored in the base station memory block 218 and the WCD memory block 227 by the base station controller 220 or the WCD controller 228 respectively, can cause the base station 102 or WCD 104 to operate in the manner described herein.

The base station antenna 215, or the WCD antenna 225, or both, may be directional antennas, for example a smart antenna as described in "Smart Antennas for Wireless Communications: IS-95 and Third Generation CDMA Application", by Joseph C. Liberti, Jr. and Theodore S. Rappaport, incorporated herein in its entirety.

The base station 102 can include a navigation receiver 240, the WCD 104 can include a navigation receiver 242, or both the base station 102 and the WCD 104 can include navigation receivers 240, 242 respectively. Examples of navigation receivers that may be included in the base station 102 and the WCD 104 include GPS receivers, LORAN receivers, GLONASS receivers, systems that use the network infrastructure to determine the speed of a WCD, and hybrid systems that use various combinations of navigation receivers. The controllers 220 and 228 in the base station 102 and the WCD 104, respectively, can be configured to receive information about the velocity of the WCD and to determine operational adjustments.

Knowledge of the location, the velocity, or both, of a mobile WCD, or mobile terminal, in a wireless communication system can be utilized to produce an estimate about the stability of the wireless environment. The estimated stability and the location and velocity of the WCD are used to make a prediction about the wireless environment. Using the prediction an improved selection of the operational mode used by the WCD, the infrastructure, or both is made. For example, knowledge of the location, velocity, or both, of a WCD can be used to select a desired transmit diversity mode, or site selection diversity, or both.

Figure 3:
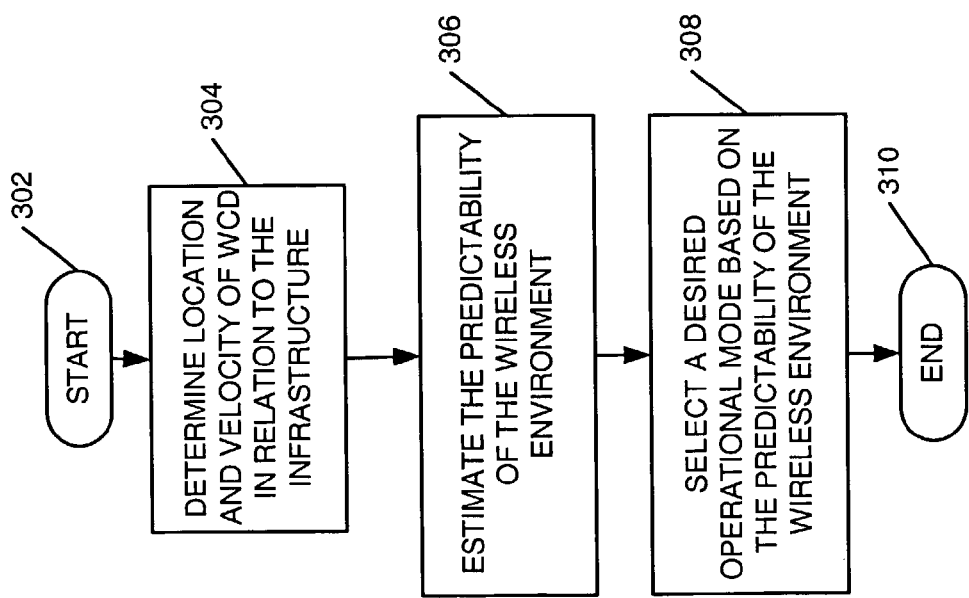
FIG. 3 is a flow diagram illustrating a technique for selecting an operational mode based on the location and velocity of a WCD in relation to the infrastructure of the wireless communication system shown in FIG. 1.

FIG. 3 is a flow diagram illustrating a technique for selecting an operational mode based on the location and velocity of a WCD in relation to the infrastructure in a wireless communication system 101. Flow starts in block 302. In block 304 the location and velocity of the WCD in relation to the infrastructure is determined. In block 306, an estimate of the predictability of the wireless environment is made.

The predictability of the wireless environment depends on many factors, such as the local geography, the distance between the WCD and the infrastructure, the terrain at the WCD's location, and the like. For example, if the WCD is operating in a region that has many obstacles, such as in a metropolitan, or a dense urban environment, then the wireless environment will typically be less stable due to changes in the multipath as the WCD and other obstacles move about. Conversely, if the WCD is operating in an open region, such as a desert region where there are few obstacles, then the wireless environment will typically be more stable. Additionally, if the WCD is located near the edge of a cell boundary then the WCD is more likely to move in and out of the coverage area. The ability to make an accurate prediction of the wireless environment is affected by the stability of the wireless environment. For example, if the WCD is operating in a region where the wireless environment is very stable, then it is likely that the wireless environment will not change radically for a period of time and will be relatively predictable. The time period of the prediction can vary from milliseconds to seconds depending on factors, such as, the geography and terrain where the WCD is located and the velocity of the WCD. Conversely, if the WCD is operating in a region where the wireless environment is very unstable, changing rapidly, then it is likely that the wireless environment will continue to change and be unpredictable.

Prediction of the wireless environment is also affected by the velocity of the WCD. For example, if the WCD is in a region where the wireless environment is stable and the WCD is not moving, or moving slowly, then it is likely that the wireless environment will remain stable and predictable. However, if the WCD is moving quickly, then depending on the local geography and terrain, it is more likely that the WCD will move to a location where the wireless environment is different. Higher velocity of a WCD adds uncertainty, and makes the wireless environment less predictable.

In some situations, only one factor may be used to predict the wireless environment, while in other situations multiple factors may be used. For example, if a WCD is located in a region where the terrain is known, such as in a city, then it may be predicted that the wireless environment will be unstable and changing due to "urban canyons" and such. Conversely, if a WCD is located in a region where it is known that there are few obstructions, such as in a desert region, then it may be predicted that the wireless environment will be stable and constant. Likewise, if a WCD is located in a region with a stable wireless environment, but the WCD is known to be moving into an unstable wireless region, then an operation mode may be selected that is suitable for operation in an unstable wireless environment. Knowledge of the location and velocity of the WCD can be used, along with factors, such as knowledge of the typical wireless environment at various locations, to improve the prediction of the wireless environment and improve overall system performance. For example, the frequency with which predictions about the wireless environment are made can be variable, decreasing in frequency when the WCD is in a known stable region and thereby reducing system overhead, or increasing in an unstable region and thereby increasing performance.

Returning to FIG. 3, at box 308 a desired operational mode is selected based on the predictability of the wireless environment. As noted above, the operational mode may involve transmit diversity or site selection diversity.

Transmit Diversity Mode

Selecting an appropriate mode of transmit diversity can improve system performance as the WCDs move about and their location relative to the infrastructure changes. Examples of transmit diversity modes include no diversity, space time transmit diversity (STTD), space diversity using fixed and steerable directional antennas, and closed-loop diversity.

Typically, if no transmit diversity is selected then the signals are transmitted between WCDs and base stations using an antenna configured as an omni-directional antenna. A problem with selecting no transmit diversity is that, as discussed above, it is possible for the multipath signals to destructively interfere with each other at the receiver, resulting in a decreased signal level at the receiver. A technique used to combat destructive interference is STTD, an open-loop transmit diversity mode based that introduces space diversity by transmitting complex symbols and their conjugates, at different times from different antennas. A detailed description of STTD may be found in "WCDMA" a telecommunication standard available from the European Telecommunications Standards Institute (ETSI). Neither of these two modes of transmit diversity (no diversity and STTD) use beam directing techniques.

The operation mode selection can be applied to systems that utilize directional antennas and thereby improve wireless communications. For example, using a directional antenna to transmit signals reduces signal spreading and decreases the volume that the transmitted signal occupies, and thereby increases the flux density, or power, of the signal within that volume. Likewise, using a directional antenna to receive signals reduces the volume "seen" by the receiver and thereby decreases the amount of interference that enters the receiver. In a typical wireless communication system there are many simultaneous users, and signals transmitted to and from these multiple simultaneous users can interfere with each other. Use of directional antennas can reduce the interference because the antenna beam pattern will only allow signals, and noise, within the covered volume to enter the receiver and will reject signals and noise that are outside the beam pattern volume. Thus, by reducing interference directional antennas may make an otherwise unstable wireless environment more stable. By improving the stability of the wireless environment a better prediction may be possible.

A problem with the use of a directional antenna is that, as the WCDs move about in relation to the infrastructure, the WCDs may move in and out of the coverage area of the antenna beam pattern. Typically, when the WCD moves out of the antenna beam pattern the infrastructure must "hand-over" the communication channel to a different antenna, either another directional antenna that has a beam pattern that covers where the WCD is located, or to a non-directional antenna that has an omni beam pattern.

A steerable directional antenna can be used to overcome the problem of the WCD leaving the antenna beam pattern coverage area. The antenna beam pattern of a steerable directional antenna is re-directed to maintain adequate communications between the WCD and the infrastructure. For example, if a steerable antenna is used in the wireless communication infrastructure, the antenna beam pattern is directed so that it covers the location of the WCD, and the antenna beam pattern is re-directed as the WCD moves. Likewise, if a steerable antenna is used in a WCD, then its antenna beam pattern is directed so that it covers the receiver in the infrastructure and is re-directed as the WCD moves. The beam pattern of a steerable antenna can be re-directed either mechanically, or electrically.

One type of steerable antenna is a "smart antenna." A smart antenna is a multi-element antenna that can be used as a directional antenna by adjusting the phase emitted by the multiple antenna elements. Using knowledge of the WCD's location as it moves about the cell in relation to the infrastructure, the base station 102 can adjust its smart antenna to always cover the region of interest in which the WCD is located.

Similar techniques can be used to adjust steerable directional antennas, such as smart antennas, in a WCD. For example, if a WCD has a smart antenna, the WCD can use knowledge of its location in relation to a base station to adjust the antenna beam pattern to cover the region where the base station is located. The location of the WCD in relation to the base station can be determined in several different ways. For example, the WCD can have access to data comprising an almanac that includes the location of the base station, or the base station can communicate its location to the WCD. As pointed out, reducing the area covered by the antenna beam pattern at any one moment in time improves signal strength and reduces noise and interference. As the WCD moves about in relation to the base station it can re-direct its beam pattern toward the base station.

Another transmit diversity mode in the system 101 is closed-loop transmit diversity. In closed-loop transmit diversity, the transmit signals are adjusted so that they constructively interfere, or reinforce, at the receiver. In one embodiment, a base station transmits 'beacon' signals from at least two antennas to a WCD. The WCD measures the phase relation between the beacon signals and sends an indication of the phase relation back to the base station. The base station can use knowledge of the phase of the received beacon signals to adjust the signals the base station transmits to the WCD so that the signals constructively interfere. A similar technique can be used to adjust signals transmitted from a WCD to a base station.

Knowledge of the location and velocity of a WCD in relation to the infrastructure can improve the selection of a transmit diversity mode. In general, location and velocity information can be used to estimate if the wireless channel is stable or rapidly changing. For example, if a WCD is moving at a high velocity, or if the WCD is at a particular location with known unstable wireless channel characteristics, then it may be estimated that the WCD is in a "fast time-varying" wireless environment. Similarly, if the WCD is moving slowly, or the WCD is at a particular location with known stable wireless channel characteristics, then it may be estimated that the WCD is in a "slow time-varying" wireless environment. Likewise, even if the WCD is at a location with known wireless channel characteristics, either stable or unstable, but the WCD is moving and entering a location with different characteristics. This knowledge can be used to make a better prediction of what the wireless channel characteristics will be and thus, select a better operational mode.

The estimation of the stability of the time varying channel can be used to determine the transmit diversity mode selected. For example, if it is estimated that a WCD is in a slow time-varying wireless environment, then there is increased confidence that the wireless environment will remain predictable for a particular period of time, such as the next few milliseconds, a few seconds, or a few minutes. Based on the confidence of the prediction concerning the wireless environment, a desired transmit diversity mode is selected. For example, if the wireless environment is estimated to be predictable, then a closed-loop technique may be desirable because it results in constructive interference at the receiver. If the wireless environment is estimated to be unpredictable such that a closed-loop transmit diversity mode will not be able to respond to the high rate of change in the wireless environment, then it may be preferable to use an open-loop transmit diversity mode such as STTD or using fixed or steerable directional antennas.

Site Selection Diversity

Site selection diversity can also improve system performance and efficiency, and knowledge of the location and velocity of a WCD 104 can improve the selection of a site diversity mode of operation. Using site selection diversity, as a mobile WCD 104 of the system 101 moves about in relation to the infrastructure, the WCD 104 can select one of a multiple of infrastructure base stations 102 to communicate with. As the WCD 104 moves about it can move from the coverage area, or cell, of a first base station into the coverage area of a second base station. Base station coverage areas overlap, so that communication between the WCD and the base station will not be "dropped" as the WCD moves from one cell to another.

Techniques for transitioning from one cell to another include a "hard hand-off," a "soft hand-off," and "fast cell selection", also referred to as site selection diversity transmission (SSDT). In a hard hand-off site selection diversity mode of operation, the WCD 104 will be in communication with a single base station but will monitor the signal strength from surrounding, or neighboring, base stations. When the signal strength from the base station that the WCD is in communication with decreases below a threshold level, the WCD will transfer its communication to a neighboring base station with a higher monitored signal level. A problem with a hard hand-off can occur if the WCD is near the boundary of two cells such that the signal levels received from the two base stations fluctuate around the same value. As the signals fluctuate, the WCD may alternate back and forth between selecting each of the two cells, resulting in inefficiency and the increased possibility of dropping the communication.

In a "soft hand-off" site diversity mode of operation, the WCD will communicate with both the initial base station it has been communicating with and the next base station to which it is transferring. Typically, adjacent cells overlap at their boundaries such that, when passing from one cell to an adjacent cell, the WCD can communicate with either base station. In a soft hand-off, as the WCD moves from an initial cell to an adjacent cell, it will simultaneously communicate with both base stations for a brief transition. After the WCD has entered far enough into the adjacent cell's coverage area to support consistent communication with the adjacent cell base station, it will stop communicating with the initial cell. Soft hand-offs avoid the problems associated with alternating back and forth between selecting each of two cells, but require additional infrastructure resources because the WCD is communicating with two cells simultaneously, and thereby reduces the overall communication system capacity.

In site selection diversity transmission (SSDT), the WCD determines which base station will transmit data to it. Typically, the determination of the desired base station is updated periodically, for example, every few milli-seconds.

Knowledge of the location and speed of a WCD in relation to the wireless infrastructure can be used to improve the selection of a desired site selection diversity mode. Using the location and speed of a WCD in relation to the wireless infrastructure a estimate of the predictability of the wireless channel can be made and based on the predictability a desired operational mode can be selected. For example, if it is estimated that the wireless channel is very predictable then an aggressive site diversity mode may be selected, such as a slow closed loop diversity like hard hand-off site diversity. If it is estimated that the wireless channel is very unpredictable then a conservate site diversity mode may be selected, such as an open loop technique like soft hand-off site diversity. If it estimated that the wireless channel predictability is somewhat predictable then a technique such as SSTD mode may be used. SSTD mode is a fast closed-loop technique and generally provides good signal transmission performance if the wireless environment is somewhat less predictable than needed for the hard hand-off site diversity mode but not so unpredictable that a soft hand-off site diversity mode is needed. In some situations, depending on the location of the WCD and if the wireless environment is rapidly time-varying it may be desired to not any use site selection diversity.

As illustrated in block 306 of FIG. 3 and as discussed above, the location and velocity of the WCD in relation to the infrastructure can be used to estimate how rapidly the wireless environment is changing. For example, if the WCD location is changing at a rate of greater than 50 kph, then the system can determine that the wireless signal path conditions are changing rapidly, and therefore the wireless channel is more likely than not unpredictable. The system will therefore not use any site selection diversity, or perhaps use SSTD ora soft hand-off site diversity mode. Conversely, if the WCD location is changing at a rate of less than 25 kph, then the system can determine that the wireless signal path conditions are probably changing slowly, and therefore the wireless channel is more likely than not predictable. The system will therefore us a technique such as hard hand-off or SSTD site selection diversity.

Figure 4:
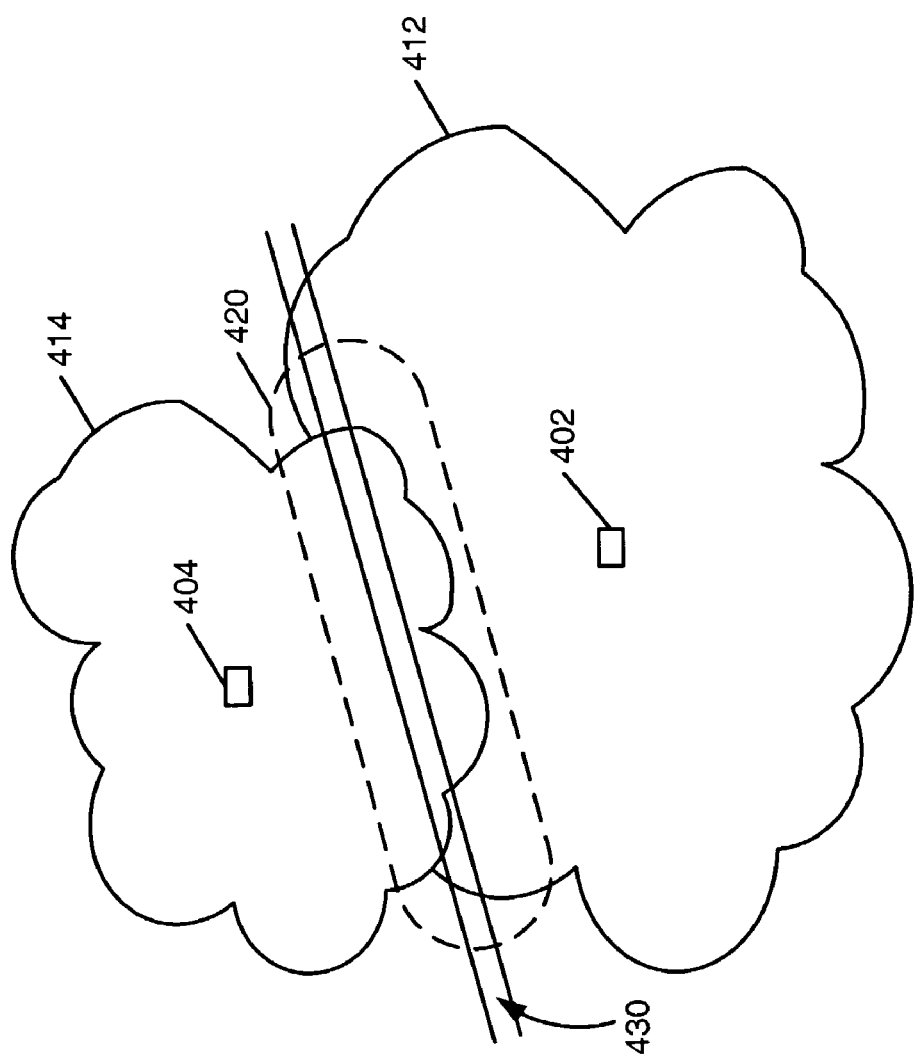
FIG. 4 is a block diagram illustrating two adjacent base stations and their respective coverage areas, or cells.

FIG. 4 is a block diagram illustrating two adjacent base stations 402 and 404 and their respective coverage areas, or cells, 412 and 414. In this example, the cells are not symmetric due to, among other things, obstacles and geographic features, such as hills and valleys. The coverage area of the two cells overlap in the region indicated by 420. That is, within the overlap region 420, a WCD is able to communicate with either base station 402 or 404.

If a mobile WCD 104 follows a path along, for example, a road 430 through the overlap region 420, it will make several transitions between the two cells 412 and 414 depending on its location. As the WCD moves along its path, depending on the speed of the WCD and the length of the path through the overlap region 420, the WCD may alternate between the two cells if using hard hand-off, or it may be in communication with both cells the entire time if using soft hand-off. Using the location and velocity of the WCD can improve the decision whether to use a hard hand-off, SSTD, soft hand-off, or no site diversity mode of operation.

Figure 5:
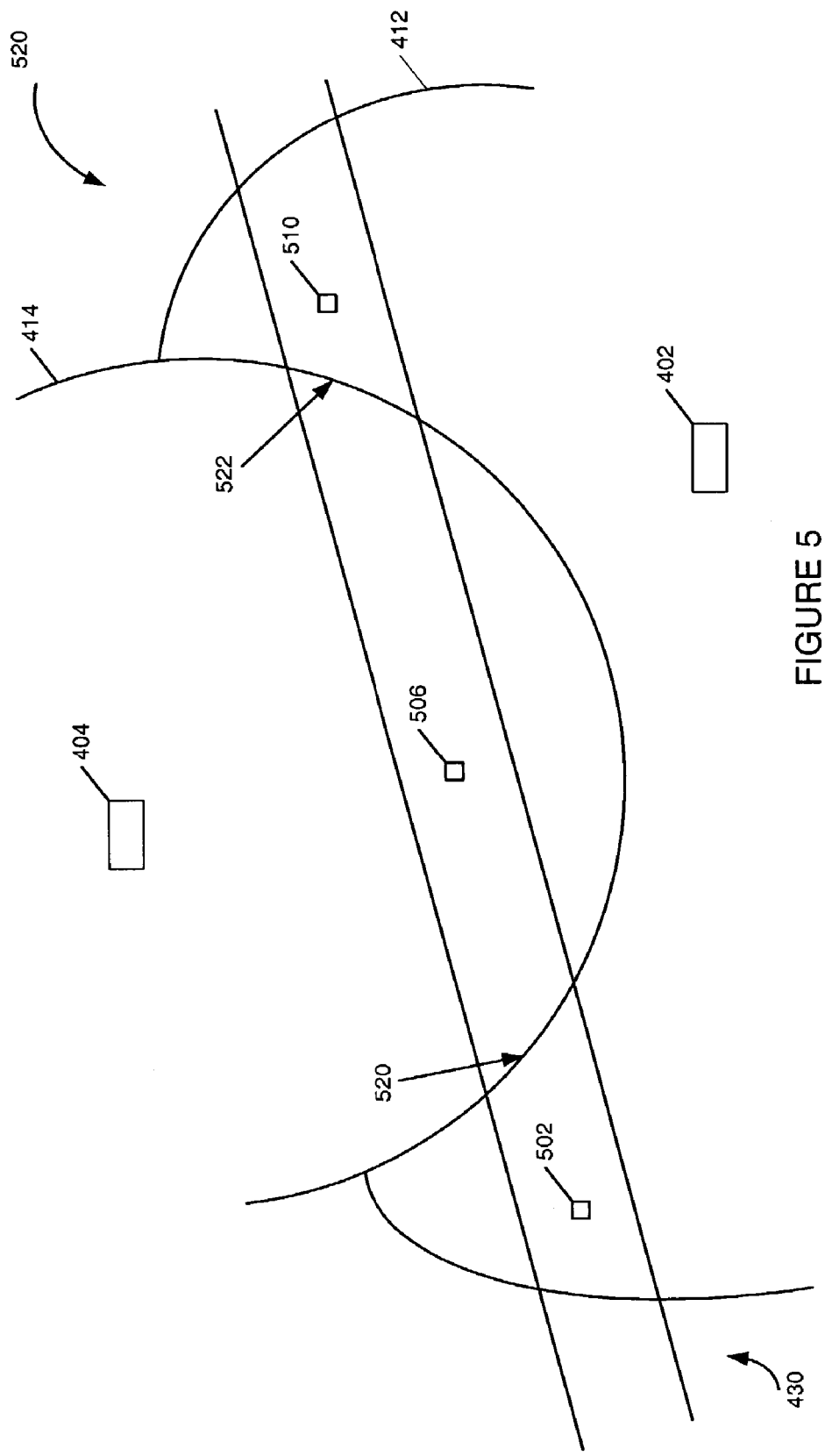
FIG. 5 is an exploded view of the overlap region of coverage cells shown in FIG. 4.

FIG. 5 is an exploded view of the overlap region 420 of cells 412 and 414 of FIG. 4. A path 430 followed by a WCD 104 through the overlap region 420 is illustrated showing the WCD 104 at various locations within the overlap region 420. When the WCD 104 is at a first location 502 it is within the coverage area 412, and will communicate with, a first base station 402. When the WCD 104 is at a second location 506 it is within the coverage area 414, and will communicate with, a second base station 404. If the WCD 104 moves to a third location 510 it will re-enter the coverage area of the first cell 412 and re-establish communication with the first base station 402.

If the WCD 104 is operating in a hard hand-off site diversity mode, as it moves from its first position 402 to its second position 406 it will make a transition from the first base station 402 to the second base station 404 at the transition between their two respective coverage areas 412 and 414, at the location indicated by 520. As the WCD continues to move to its third location 510 it will transition back to the coverage area 412, of the first base station 402 at the transition between the coverage cells 414 and 412, at the location indicated by 522. If the WCD follows the same path but is using soft hand-offs, it will make the same transitions, but instead of being in communication with only one base station it will communicate with both base stations from just before until just after it passes the cell transitions 520 and 522. If the WCD is using SSDT the WCD will determine which of the base stations will transmit data to the WCD at each location.

As the WCD 104 proceeds through the overlap region 420 it may be desirable to use site diversity, and allow hard hand-off, soft hand-offs, SSDT site diversity, or it may be desirable to disable site diversity. Using the location and velocity of the WCD, an estimate of predictability of the wireless channel can be made. Using the estimated predictability a desired site selection diversity mode can be selected. For example, if it is estimated that the wireless channel is slowly time-varying, and predictable, then a hard hand-off site diversity mode may be selected. Selection of a hard hand-off site diversity mode may be based, for example, on the velocity of the WCD and the rate that the WCD will transition from one base station to another.

If the estimated predictability of the wireless environment is varying at a somewhat higher rate than the slow time-varying rate needed for the hard or soft hand-off techniques, SSTD may be used. In SSTD, the WCD can select a desired base station to transmit data to the WCD for a period of time, for example, a few milliseconds. At the end of the period of time, the WCD 104 will select a base station to transmit data to it during the next time period. The selected base station may be the same base station or a different base station than previously selected. In addition, if it is estimated that the wireless environment is rapidly varying, and unpredictable, then it may be desirable to select a soft hand-off site diversity mode of operation. It may also be desirable to use no site selection diversity, for example if the wireless channel is very unpredictable.

Figure 6:
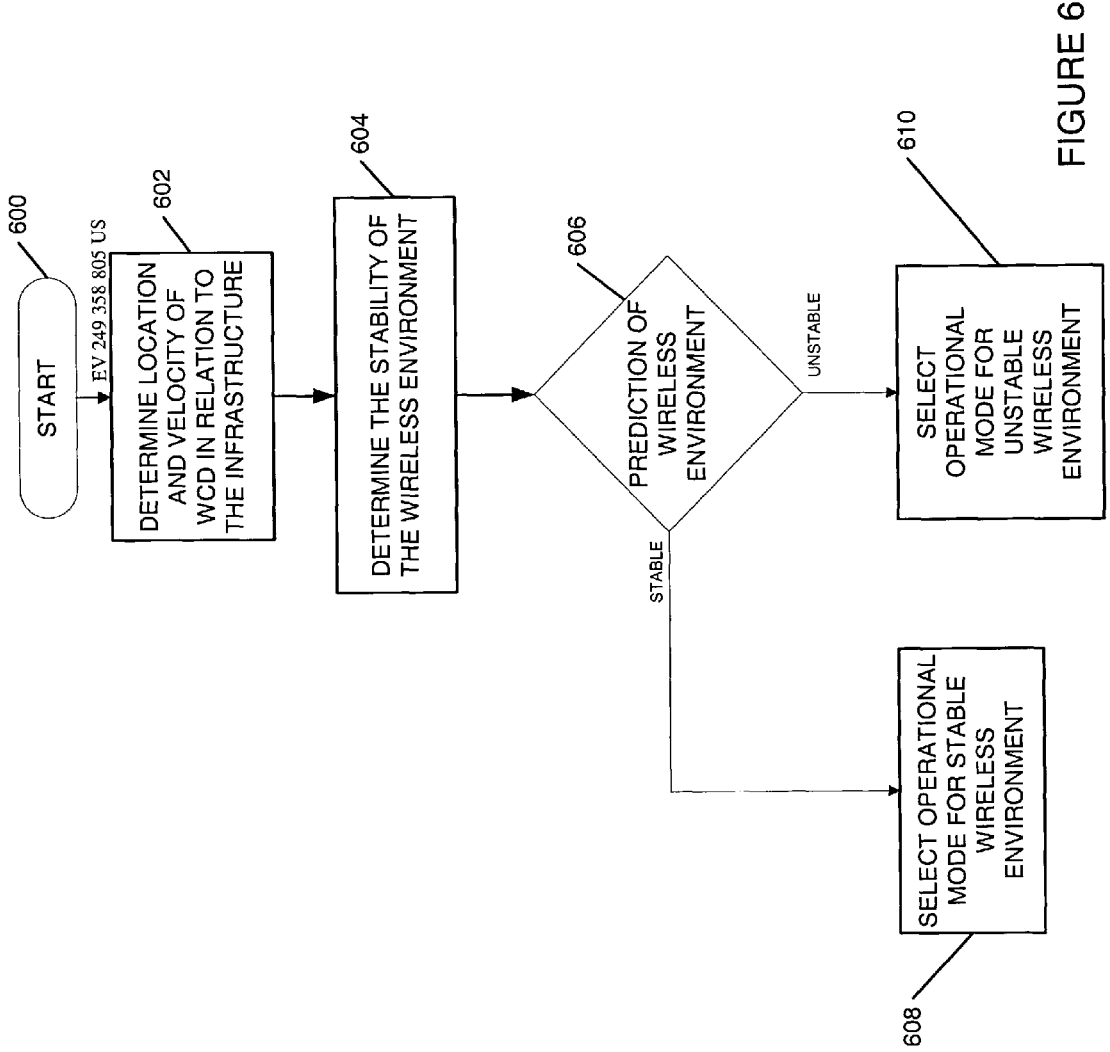
FIG. 6 is a flow diagram illustrating one embodiment of a technique for selecting an operational mode based on a prediction of the wireless environment.

FIG. 6 is a flow diagram illustrating one embodiment of a technique for selecting an operational mode based on a prediction of the wireless environment. Flow starts in block 600. In block 602 the location and velocity of the WCD in relation to the infrastructure is determined. Flow continues to block 604 where, using knowledge of the location and velocity of the WCD, the stability of the wireless environment is determined. Flow then continues to block 606 where, using knowledge of the velocity and location of the WCD in relation to the infrastructure and the stability of the wireless environment, a prediction of the wireless channel is made. If in block 606, it is predicted that the wireless environment will be stable, then flow continues to block 608 where an appropriate operational mode is selected for use in a stable wireless environment. For example, a closed-loop diversity mode may be selected. If in block 606 it is predicted that the wireless environment will be unstable, then flow continues to block 610 and an appropriate operational mode is selected for use in an unstable wireless environment. For example, a hard hand-off, SSTD, or soft hand-off site diversity mode may be selected, or no diversity, mode may be selected.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is configured such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

The invention claimed is:

1. A method of selecting an operational mode in a wireless communication system, the method comprising:
    determining a location of a wireless communication device in relation to a wireless network infrastructure;
    estimating a stability of a signal path condition in a wireless environment between the wireless communication device and the wireless network infrastructure based, at least in part, on the location of the wireless communication device; and
    selecting between a transmit diversity mode and a site selection diversity mode based, at least in part, on the estimated stability of the signal path condition, wherein the selected mode is for use by at least one of the wireless communication device or the wireless network infrastructure.

2. A method as defined in claim 1, wherein the transmit diversity mode comprises a closed loop diversity mode.

3. A method as defined in claim 1, wherein the location of the wireless communication device is determined by the wireless communication device.

4. A method as defined in claim 1, wherein the location of the wireless communication device is determined by the wireless network infrastructure.

5. The method as defined in claim 1, and further comprising:
   estimating the stability of the signal path condition based, at least in part, on a distance between the wireless communication device and the wireless network infrastructure based on the location of the wireless communication device.

6. The method as defined in claim 1, and further comprising:
   estimating the stability of the signal path condition based, at least in part, on a terrain associated with the location of the wireless communication device.

7. The method as defined in claim 1, wherein the estimated stability comprises a likelihood that the signal path condition will change.

8. The method as defined in claim 1, wherein the estimated stability comprises a predictability of the signal path condition.

9. The method as defined in claim 1, wherein the estimated stability comprises a time-varying characteristic of the signal path condition.

10. The method as defined in claim 1, wherein the selecting comprises selecting between different types of transmit diversity.

11. The method as defined in claim 1, wherein the selecting comprises selecting between different types of site selection diversity.

12. The method as defined in claim 1, further comprising determining a velocity of the wireless communication device, wherein selection of the operational mode is further based, at least in part, on the determined velocity.

13. A method as defined in claim 1, wherein the transmit diversity mode comprises an open-loop diversity mode.

14. A method as defined in claim 13, wherein the open-loop diversity mode comprises a space time transmit diversity mode.

15. A method as defined in claim 13, and further comprising:
   using a beam forming antenna in the open-loop diversity mode.

16. A method as defined in claim 15, wherein the beam forming antenna comprises a smart antenna.

17. A method as defined in claim 15, wherein the beam forming antenna is in the wireless communication device.

18. A method as defined in claim 15, wherein the beam forming antenna is in the wireless network infrastructure.

19. A wireless communication device comprising:
   a transmitter;
   a receiver; and
   a controller to:
      estimate a stability of a signal path condition in a wireless environment between the wireless communication device and a wireless network infrastructure based, at least in part, on a location of the wireless communication device in relation to the wireless network infrastructure; and
      based, at least in part, on the estimated stability of the signal path condition, select between a transmit diversity mode and a site selection diversity mode for use in communicating signals between the wireless communication device and the infrastructure via the receiver or transmitter, wherein the selected mode is for use by at least one of the wireless communication device or the wireless network infrastructure.

20. A wireless network infrastructure comprising:
   a transmitter;
   a receiver; and
   a controller to:
      estimate a stability of a signal path condition in a wireless environment between a wireless communication device and the wireless network infrastructure based, at least in part, on a location of the wireless communication device in relation to the wireless network infrastructure; and
      based, at least in part, on the estimated stability of the signal path condition, select between a transmit diversity mode and a site selection diversity mode for use in communicating signals between the wireless communication device and the wireless network infrastructure via the receiver or transmitter, wherein the operational mode is for use by at least one of the wireless communication device or the wireless network infrastructure.

21. An apparatus comprising:
   means for determining a location of a wireless communication device in relation to a wireless network infrastructure;
   means for estimating a stability of a signal path condition in a wireless environment between the wireless communication device and the wireless network infrastructure based, at least in part, on the location of the wireless communication device; and
   means for selecting between a transmit diversity mode and a site selection diversity mode based, at least in part, on the estimated stability of the signal path condition, wherein the selected mode is for use by at least one of the wireless communication device or the wireless network infrastructure.

22. A wireless communication device comprising:
   means for communicating via wireless signals with a wireless network infrastructure;
   means for estimating a stability of a signal path condition in a wireless environment between the wireless communication device and the wireless network infrastructure based, at least in part, on a location of the wireless communication device in relation to the wireless network infrastructure; and
   means for selecting between a transmit diversity mode and a site selection diversity mode based, at least in part, on the estimated stability of the signal path condition, wherein the selected mode is for use by at least one of the wireless communication device or the wireless network infrastructure.

23. A wireless network infrastructure comprising:
   means for communicating via wireless signals with a wireless communication device; and
   means for estimating a stability of a signal path condition in a wireless environment between the wireless communication device and the wireless network infrastructure based, at least in part, on a location of the wireless communication device in relation to the wireless network infrastructure; and
   means for selecting between a transmit diversity mode and a site selection diversity mode based, at least in part, on the estimated stability of the signal path condition, wherein the selected mode is for use by at least one of the wireless communication device or the wireless network infrastructure.

24. An article comprising:
   a storage medium having instructions stored therein that are executable by a processor to:

determine a location of a wireless communication device in relation to a wireless network infrastructure;

estimate a stability of a signal path condition in a wireless environment between the wireless communication device and the wireless network infrastructure based, at least in part, on the location of the wireless communication device; and select between a transmit diversity mode and a site selection diversity mode based, at least in part, on the estimated stability of the wireless environment, wherein the selected mode is for use by at least one of the wireless communication device or the wireless network infrastructure.

25. The article as defined in claim 24, wherein the transmit diversity mode comprises an open-loop diversity mode.

26. The article as defined in claim 24, wherein the transmit diversity mode comprises a closed loop diversity mode.

27. The article as defined in claim 24, wherein the location of the wireless communication device is determined by the wireless communication device.

28. The article as defined in claim 24, wherein the location of the wireless communication device is determined by the wireless network infrastructure.

29. The article as defined in claim 25, wherein the open-loop diversity mode comprises a space time transmit diversity mode.

30. The article as defined in claim 25, wherein the open-loop diversity mode further comprises use of a beam forming antenna.

31. The article as defined in claim 30, wherein the beam forming antenna comprises a smart antenna.

32. The article as defined in claim 30, wherein the beam forming antenna is in the wireless network infrastructure.

* * * * *